United States Patent
Ruef et al.

(10) Patent No.: US 10,011,948 B2
(45) Date of Patent: Jul. 3, 2018

(54) PROCESS FOR RECAUSTICIZING GREEN LIQUOR

(71) Applicant: Mondi AG, Vienna (AT)

(72) Inventors: Walter Ruef, Wolfsberg (AT); Manfred Hacker, Bad St. Leonhard (AT); Stefan Raffalt, St. Gertraud (AT)

(73) Assignee: MONDI AG, Vienna (AT)

( * ) Notice: Subject to any disclaimer, the term of this patent is extended or adjusted under 35 U.S.C. 154(b) by 0 days.

(21) Appl. No.: 14/770,596

(22) PCT Filed: Feb. 18, 2014

(86) PCT No.: PCT/AT2014/000034
§ 371 (c)(1),
(2) Date: Aug. 26, 2015

(87) PCT Pub. No.: WO2014/131067
PCT Pub. Date: Sep. 4, 2014

(65) Prior Publication Data
US 2016/0002852 A1    Jan. 7, 2016

(30) Foreign Application Priority Data
Feb. 26, 2013    (AT) .................................. A 148/2013

(51) Int. Cl.
*D21C 11/00*    (2006.01)

(52) U.S. Cl.
CPC ...... *D21C 11/0078* (2013.01); *D21C 11/0071* (2013.01); *D21C 11/0085* (2013.01); *Y02P 40/44* (2015.11)

(58) Field of Classification Search
CPC ............ D21C 11/0078; D21C 11/0071; D21C 11/0064; D21C 11/0085
See application file for complete search history.

(56) References Cited

U.S. PATENT DOCUMENTS 2,552,183 A    5/1951   Knight
2,841,561 A    7/1958   Gray et al.
(Continued)

FOREIGN PATENT DOCUMENTS

EP    0 524 743    1/1993
WO    85/01966    5/1985
(Continued)

OTHER PUBLICATIONS

International Search Report dated Jul. 15, 2014 in International application No. PCT/AT2014/000034.

*Primary Examiner* — Anthony Calandra
(74) *Attorney, Agent, or Firm* — Jacobson Holman, PLLC.

(57) ABSTRACT

A process for recausticizing green liquor in a sulphate or Kraft process for wood pulp production, in which a green liquor consisting of an aqueous solution of sodium carbonate as the major component and sodium sulphide is admixed with calcium oxide in a slaker and undergoes a reaction in a recausticizer to form an aqueous suspension containing sodium hydroxide and calcium carbonate as the major components, which suspension is filtered on a first filter and subsequently, after dilution with water in a dilution vessel, is fed over further filters two or three times and filtered to separate solids suspended therein, characterized in that after a first separation of calcium carbonate as the major component and calcium oxide as the minor component, carbon dioxide is added to the aqueous suspension at least during dilution in a dilution vessel and in particular in the dilution vessel (s) upstream of a second and/or a third filter.

15 Claims, 2 Drawing Sheets

(56) References Cited

U.S. PATENT DOCUMENTS

Figure 1:
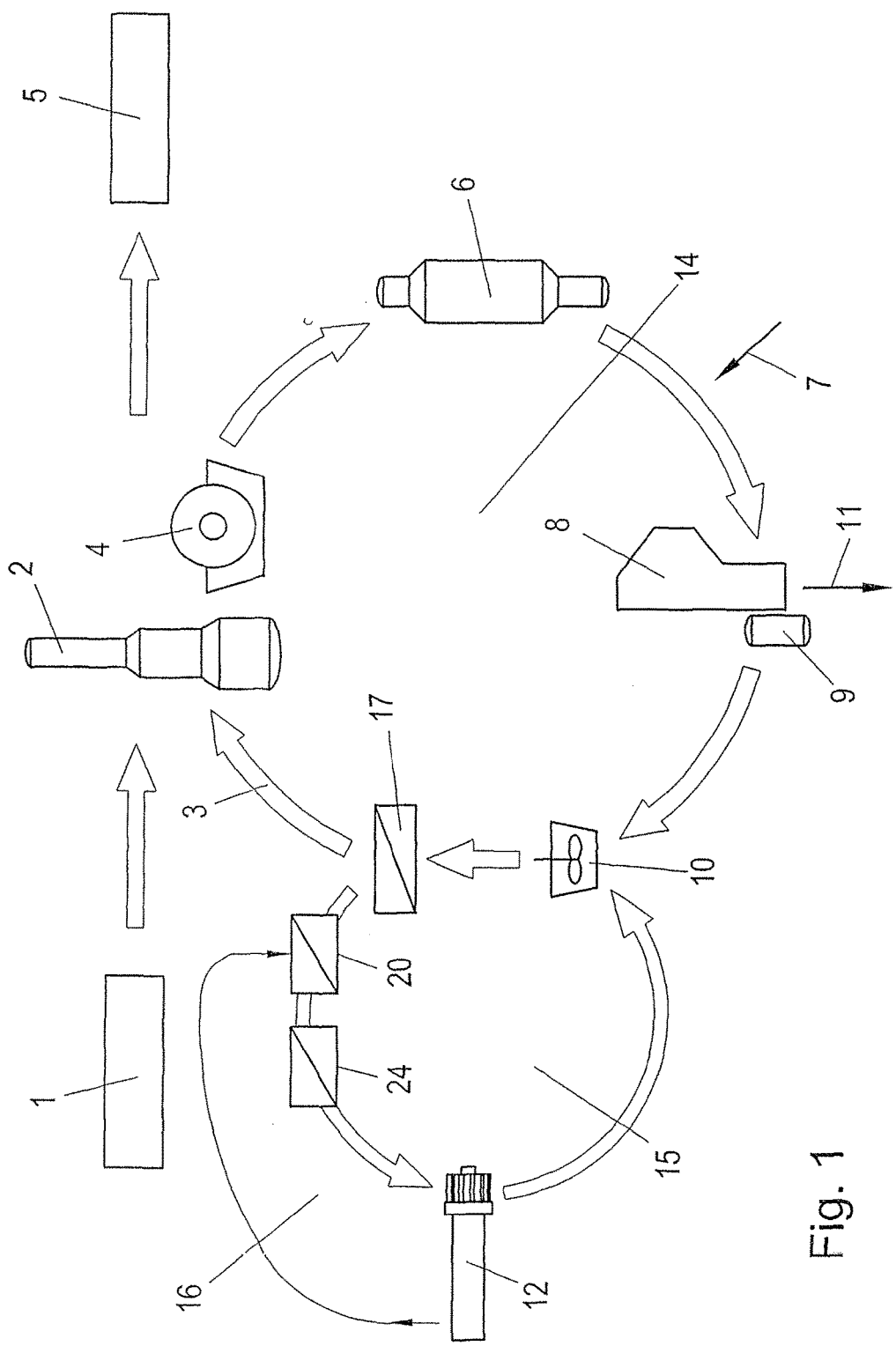

| | | | | |
|---|---|---|---|---|
| 3,054,825 | A | * | 9/1962 | Craig ................ C07C 45/32 562/597 |
| 3,268,387 | A | * | 8/1966 | Casciani ............ C01F 11/181 162/30.11 |
| 3,833,464 | A | * | 9/1974 | Rolfe ................. C02F 1/66 162/189 |
| 4,391,671 | A | * | 7/1983 | Azarniouch ......... C04B 2/108 162/30.1 |
| 4,561,934 | A | | 12/1985 | Rimpi |
| 6,136,144 | A | * | 10/2000 | Martin ............... B01D 53/502 162/14 |
| 2007/0092422 | A1 | * | 4/2007 | Hamalainen ......... D21C 11/06 423/243.01 |
| 2008/0053337 | A1 | * | 3/2008 | Sohara ............... C09C 1/021 106/464 |
| 2008/0219912 | A1 | * | 9/2008 | Olsen ................ B01D 53/38 423/430 |
| 2013/0129601 | A1 | * | 5/2013 | Sohara ............... C01F 11/18 423/432 |

FOREIGN PATENT DOCUMENTS

| | | |
|---|---|---|
| WO | 94/01617 | 1/1994 |
| WO | 95/21291 | 8/1995 |
| WO | 97/22752 | 6/1997 |
| WO | 2005/056917 | 6/2005 |
| WO | 2005/116329 | 12/2005 |
| WO | 2012/027223 | 3/2012 |

* cited by examiner

PROCESS FOR RECAUSTICIZING GREEN LIQUOR

The present invention relates to a process for recausticizing green liquor in the sulphate or Kraft process for wood pulp production. In which a green liquor consisting of an aqueous solution of sodium carbonate as the major component and sodium sulphide is admixed with calcium oxide in a slaker and undergoes a reaction in a recausticizer to form an aqueous suspension containing sodium hydroxide and calcium carbonate as the major components, which suspension is filtered on a first filter and subsequently, after dilution with water in a dilution vessel, is fed over further filters two or three times and filtered to separate solids suspended therein.

BACKGROUND OF THE INVENTION

During wood pulp production in a sulphate or Kraft process, a wood pulp-containing fibrous material is digested in a solution containing sodium hydroxide and sodium sulphide, which is known as white liquor. This digestion produces a wood pulp and also what is known as black liquor as a by-product. In a process for recovering the by-products in the Kraft process, unreacted chemicals or reaction products and in particular the recyclable components of the black liquor are recovered and used again for wood pulp production. To this end, the black liquor is firstly concentrated by evaporation, then incinerated in order to produce what is known as smelt. The smelt is dissolved and a green liquor is obtained; said green liquor contains sodium carbonate and sodium sulphide as the major components. The green liquor is then supplemented with quicklime or calcium oxide so that the sodium carbonate can be reacted to form sodium hydroxide and calcium carbonate in what is known as the recausticizing reaction in accordance with the overall equation $Na_2CO_3+CaO+H_2O=NaOH+CaCO_3$. The converted mixture is filtered through a filter on which solids, primarily calcium carbonate, also known as lime mud, are separated. The separated solids are diluted with water or filtrate from a downstream filtering stage, filtered again through a filter, transferred to the lime kiln and transformed into quicklime. The filtrate obtained is returned to the process as white liquor.

The reaction of green liquor with calcium oxide is an equilibrium reaction which in practice only goes to a conversion of 80% to 85% of the sodium carbonate, i.e. to a level of recausticizing of 80% to 85%. From the point of view of process economics, this low conversion level is dependent on various factors such as the total alkali concentration, the sodium sulphide concentration, the temperature as well as the excess of calcium oxide, for example. In particular, the amount of excess of calcium oxide which is necessary for as complete a reaction of the sodium carbonate to calcium carbonate and sodium hydroxide as possible has a disruptive effect on the subsequent process and in particular on the filterability of the lime mud, as well as on the downstream lime circuit in which calcium carbonate incinerated to regain the calcium oxide. The excess quantity of calcium oxide, which is usually a maximum of approximately 5%, sediments out, in particular onto the filter cloths and sieves, or gives rise to what is known as ring and ball formation in the lime kiln; these are associated with substantial losses and disruptions to the process.

A process for controlling the sodium carbonate concentration in the green liquor is described in EP 0 524 743 B1, for example, in which process, based on a measurement of the conductivity of a green liquor and a measurement of the conductivity and rate of flow of a washing solution, the sodium carbonate concentration of the green liquor can be adjusted or readjusted.

Furthermore, WO 85/01966 describes a process for recausticizing green liquor in which lime is added in a two-stage recausticizing process in a manner such that the lime which is used in a first recausticizing stage is of lower quality than the lime which is used in the second recausticizing stage; in this manner, it is hoped that as much sodium carbonate as possible is transformed into sodium hydroxide; the liquor can then be used in the paper manufacturing process.

BRIEF SUMMARY OF THE INVENTION

Thus, the aim of the present invention is to provide a process by means of which the quantity of unreacted calcium oxide in the separated lime mud can be reduced as much as possible following a recausticizing without having a negative influence on the overall process.

This aim is achieved by means of the process in accordance with the invention which is essentially characterized in that after the first separation of calcium carbonate as the major component and calcium oxide as the minor component, carbon dioxide is added to the aqueous suspension at least during dilution in a dilution vessel and in particular in the dilution vessel(s) upstream of a second and/or a third filter. Because carbon dioxide ($CO_2$) is added to the aqueous suspension containing calcium carbonate as the major component as well as residues of calcium oxide at least during a dwell time in the dilution vessel prior to filtering, the calcium oxide present in residual quantities is converted into calcium carbonate to as great an extent as possible, and thus the equilibrium reaction described above is displaced towards calcium carbonate. By reducing the residual quantity of calcium oxide, the filterability of the lime mud is substantially improved primarily because of the better crystallinity of the calcium carbonate compared with that of calcium oxide, so that sedimentation onto filter cloths or filters during filtration is essentially prevented. Because at the same time, the residual quantity of calcium oxide is substantially reduced by adding carbon dioxide, then in addition, almost pure calcium carbonate is returned to the lime circuit of a wood pulp digestion process so that in addition, the disadvantageous effects in the lime kiln, such as ring formation or ball formation, are prevented or substantially reduced, so that overall, the economy of the process is substantially improved compared with conventional processes.

In a further embodiment of the invention, insofar as a period for supplying carbon dioxide to the aqueous suspension containing calcium carbonate as the major component and calcium oxide as the minor component contained in the dilution vessel is selected such that a pH of the aqueous suspension in the range 8.0 to 13.0, in particular 8.5 to 12 is obtained, then on the one hand, calcium oxide is almost completely converted into calcium carbonate and on the other hand, the process is carried out in a manner such that it is always sufficiently basic for the calcium carbonate not to dissolve with the formation of calcium bicarbonate.

For a particularly efficient removal of calcium oxide and in particular to prevent sedimentation onto the filter or filter cloths in the filtration stages with certainty, in accordance with a preferred embodiment of the invention, the process is carried out in a manner such that the carbon dioxide addition is additionally carried out upstream of a dilution vessel of at least one of the second or third lime mud filters. Insofar as the carbon dioxide is additionally added or supplied upstream of a dilution vessel of at least one of the second and third lime mud filters, this ensures that the carbon dioxide addition is of sufficient duration for fine calcium oxide not to sediment out onto the filter, so that the process can be carried out without interruption and in particular, almost exclusively calcium carbonate can be returned to the lime kiln.

In order to convert the disruptive calcium oxide almost completely into calcium carbonate, and in order in this manner to prevent sedimentation of the filter or filter cloths of both the second and also the third filtration stage with certainty, the process of the invention is carried out in a manner such that the carbon dioxide supply is alternatively disposed in the dilution vessel which is associated with the second filter, or in addition, if a third filter is present, in the dilution vessel which is associated with the third filter. Dosing into both dilution vessels is also possible.

For a particularly complete separation of the calcium oxide, it has been shown to be advantageous if the period for supplying carbon dioxide is selected so as to coincide with the dwell time in the dilution vessel. In this manner, during the whole period of dwell in the dilution vessel which is associated with either the second or the third filtration stage or even into that of the two which is upstream of the second and third filter stage, carbon dioxide is continuously introduced in order to obtain a slow and quasi-quantitative conversion of the remaining calcium oxide into calcium carbonate. Other procedures, such as a short period for supplying large quantities of carbon dioxide, have not been shown to be advantageous.

Particularly complete conversion of calcium oxide into calcium carbonate is obtained in accordance with the invention when carbon dioxide is added for a period of between 5 and 120 minutes, in particular between 5 and 30 minutes. Because carbon dioxide is injected over a longer period, in particular between 5 and 120 minutes into at least one dilution vessel associated with and upstream of a filtration stage, almost quantitative conversion of the calcium oxide into calcium carbonate is ensured, without the pH of the suspension dropping too low at the same time, which drop would dissolve the calcium carbonate, with the formation of calcium bicarbonate.

In order to ensure that contact of the carbon dioxide with the calcium oxide contained in the dilution vessel is as intimate as possible and in order to maximize the dwell time for the carbon dioxide in the dilution vessel, in a further embodiment of the process, carbon dioxide is introduced into the dilution vessel via a vessel floor of the dilution vessel. By proceeding in this manner, and in particular when carbon dioxide is supplied to the dilution vessel disposed upstream of a filtration stage in a finely divided manner via the vessel floor, intimate contact and simultaneous thorough mixing of the contents of the dilution vessel with simultaneous maximization of the dwell time for the carbon dioxide is ensured, so that the reaction of calcium oxide to form calcium carbonate can no even further to completion.

For a particularly uniform distribution of the carbon dioxide in the dilution vessel upstream of the filter, the process of the invention is conducted in a manner such that carbon dioxide is introduced into the aqueous suspension in a finely divided manner via one or more inlet opening(s). One or a plurality of inlet opening(s) ensure(s) that the whole suspension comes into intimate contact with the carbon dioxide and simultaneously, the dwell time for the carbon dioxide is sufficient for the calcium oxide to react to form calcium carbonate to completion as far as is possible. In this regard, for example, in accordance with a further embodiment, of the invention, carbon dioxide is introduced via a sparger into the line to the dilution vessel or alternatively, introduction devices comprising a plurality of through openings may be introduced via the vessel floor, and in particular can thereby ensure that the admixing of the suspension contained in the dilution vessel with carbon dioxide is as complete as possible, and thus the reaction of calcium oxide to form calcium carbonate is as complete as possible.

Preferably, in order to obtain a particularly advantageous ratio between the drop in the pH which occurs due to the addition of carbon dioxide and the completion of the calcium oxide conversion, in a further embodiment of the invention, a total quantity or 0.1% to 5% by weight, preferably 0.4% to 2.5% by weight of dry carbon dioxide/kg of dry lime mud is added. By adding such a quantity, an optimized compromise is obtained which provides for quasi-complete conversion of calcium oxide to calcium carbonate, without at the same time dropping the pH so far that the lime mud dissolves with the formation of calcium bicarbonate.

In accordance with a further embodiment of the invention, the process is carried out in a manner such that the carbon dioxide is added at a temperature between 40° C. and 105° C., in particular 65° C. to 100° C. Selecting the temperature in this manner is particularly preferable on the grounds of the energy balance of the overall process or the economics of the process since, after taking up or suspending the residues from the liquor incineration, the green liquor is approximately at a temperature which is between 60° C. and 105° C., so that advantageously, neither cooling or heating is carried out upstream of the filter and the white liquor that is subsequently formed can then be supplied to the digester, in which raised temperatures prevail with, as far as possible, no prior reduction of the temperature, in order to avoid energy losses. Thus, carbon dioxide is best passed through at the prevailing temperature of the green liquor.

The carbon dioxide used in the process of the invention may be pure carbon dioxide, carbon dioxide diluted with air or carbon dioxide as flue gas. Using pure carbon dioxide or carbon dioxide diluted with air in the process is particularly economical, since the quantity of carbon dioxide, to be used can be quantitatively determined or calculated in advance, so that the addition of a surplus quantity can be avoided with certainty. When the carbon dioxide is supplied as flue gas, a waste product is recycled, and so the overall energy balance of the process is substantially improved because a waste product is used.

In accordance with a further embodiment of the process of the invention, the process is carried out in a manner such that flue gas from a lime kiln is used as the carbon dioxide source. In addition to the process for digestion of wood chips or shavings to form wood pulp, wood pulp production also includes what is known as an alkali circuit with which the spent liquor from washing in the wood pulp digestion process is circulated and recyclable products, in particular sodium hydroxide and sodium sulphide, are prepared such that they can once again be fed into a digester, and on the other side, what is known as a lime circuit is connected up, in which calcium carbonate formed from green liquor can be transformed back into lime mud or calcium oxide in a lime kiln during recausticizing and subsequently can be used again in the recausticizing stage. Flue gas from the lime kiln is thus a source of carbon dioxide which results directly from the overall process, which means that no external addition of carbon dioxide is required, but rather, carbon dioxide which is internal to the process is circulated, whereupon a process of this type is particularly economical to operate.

BRIEF DESCRIPTION OF THE SEVERAL VIEWS OF THE DRAWING(S)

Figure 2:
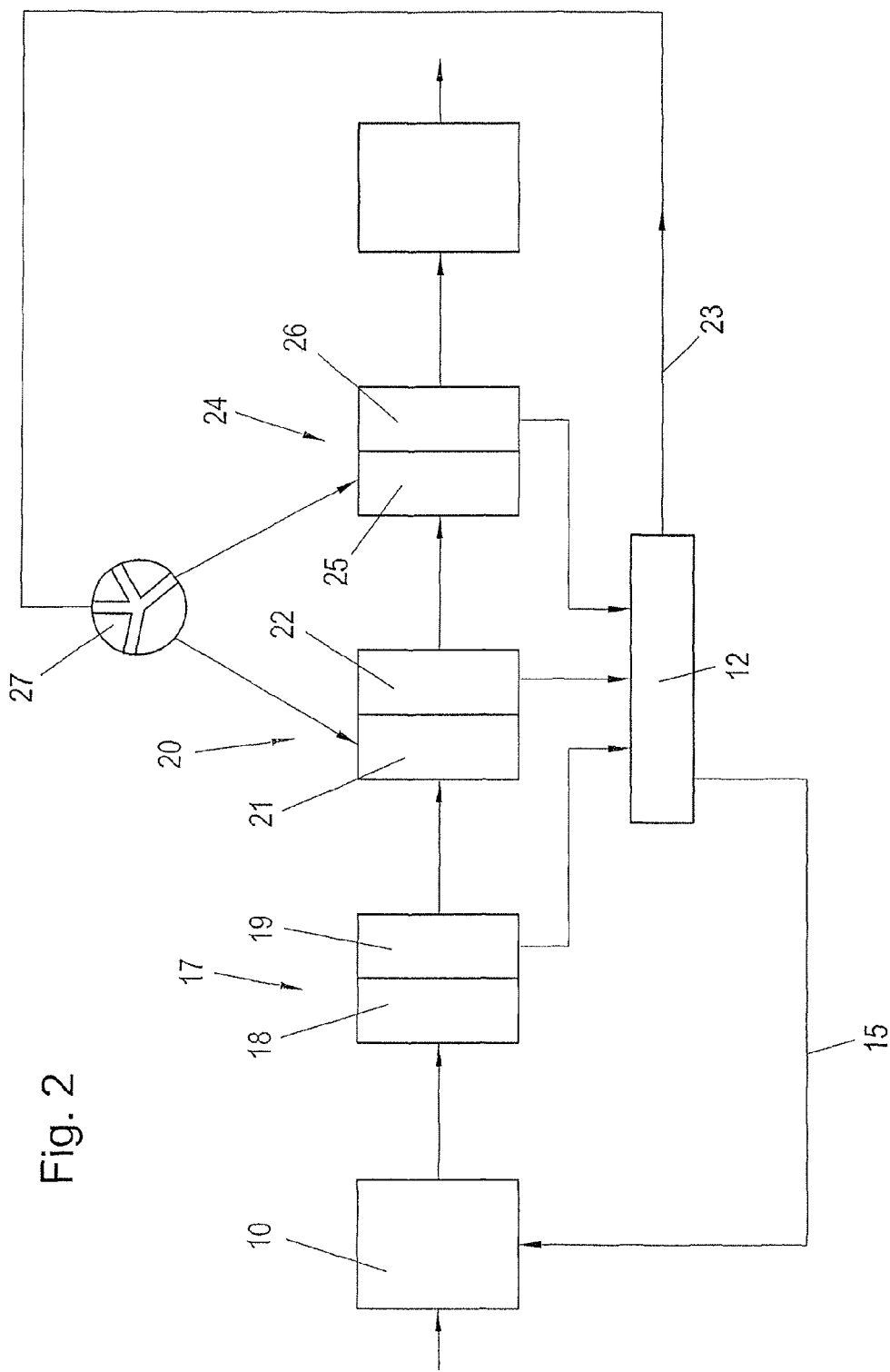

The invention will now be explained in more detail with the aid of the drawings and exemplary embodiments, in which:

FIG. 1 is a diagrammatic flowchart of the wood pulp digestion process as well as the associated alkali circuit, lime circuit and carbon dioxide circuit in accordance with the invention; and FIG. 2 is a diagrammatic flowchart of the process in accordance with the invention, in which only a portion of the alkali circuit, the lime circuit or the $CO_2$ circuit is shown.

DETAILED DESCRIPTION OF THE INVENTION

In more detail, in FIG. 1, the numeral 1 diagrammatically represents wood chips, which are introduced into the digester 2. In addition to the chips 1, white liquor is also fed into the digester 2; the feed path for the white liquor consisting primarily of sodium hydroxide and sodium sulphide is indicated diagrammatically by the numeral 3. After carrying out the digestion process, which does not form part of the invention, in the digester 2, the digested chopped wood or chips 1 are introduced into a washer 4 and the cleaned wood pulp which exits the washer 4 is transferred to or introduced into a papermaking factory or an operation which carries out further processing of wood pulp.

The spent washing liquor from the washer 4 which is known as weak liquor or black liquor, is introduced into an evaporation unit 6 in which the weak liquor, which is essentially constituted by sodium sulphide-lignin compounds and water, is concentrated. After evaporation or concentration in the evaporation unit 6, the strong liquor produced in this evaporation unit, which primarily has a lower water content compared with the weak liquor, is supplemented with sodium sulphate as shown diagrammatically by the arrow 7, and introduced into the liquor incineration stage 8. A smelt is obtained from the liquor incineration 8, which smelt is dissolved in the boiler 9 and a green liquor which essentially consists of sodium carbonate and sodium sulphide as well as water is supplied to a recausticizer 10. As is shown diagrammatically by the arrow 11, in addition to the formation of smelt, energy, namely steam or electric current, generated by liquor incineration at 8, which energy, as is indicated diagrammatically, is removed from the liquor incineration 8 and returned to the process or can be re-used in the process.

In the recausticizing step 10, the green liquor is supplemented with quicklime which originates from a lime kiln in order to convert the sodium carbonate from the green liquor into calcium carbonate and sodium hydroxide in what is known as the recausticizing reaction; the sodium hydroxide can subsequently be re-used in the digester 2 to digest chips or chopped wood.

When recausticizing in the recausticizer 10, a mixture is obtained which essentially consists of sodium hydroxide, sodium sulphide and calcium carbonate, wherein unreacted calcium oxide is also contained in this mixture; this is because the conversion reaction of sodium carbonate with calcium oxide and water is an equilibrium reaction, and so unreacted calcium oxide is always present in the product. In order to separate the solid materials, namely in particular calcium carbonate and calcium oxide, the product from the recausticizer 10 is subsequently guided over a first filter unit 17 and solids are separated out, whereas liquid substances are returned to the digester 2. The separated solids, in particular calcium carbonate as well as any remaining calcium oxide, are then returned to the lime kiln 12 via a second and third filtration stage 20 and 24, in order to be incinerated in the lime kiln 12 to form calcium oxide which can subsequently be returned to the recausticizer 10.

In this regard, both alkalis and lime are circulated, wherein the circuits are diagrammatically shown in FIG. 1 as 15 for the lime circuit and 14 for the alkali circuit. In accordance with the invention, it has been shown to be advantageous if, in addition to the lime circuit 15 and the alkali circuit 14, a further component, namely the carbon dioxide, is circulated; the carbon dioxide circuit is diagrammatically shown by numeral 16. In this carbon dioxide circuit 16, at least a portion of the carbon dioxide released from the calcium carbonate during incineration of the lime is returned to the filter or the second filter 20 in order to displace the reaction of sodium carbonate with calcium oxide further in the direction of calcium carbonate and sodium hydroxide.

FIG. 2 shows a detail of the filtration after the recausticizer 10 as well as the return of carbon dioxide in accordance with the invention to the filter stages 20 or 24 in more detail.

In this figure, the material removed from the recausticizer 10 undergoes a first filtration stage 17, which consists of a dilution vessel 18 and a downstream filter 19. After dilution in the dilution vessel 18, in particular with water, the washed lime mud is removed in the second filtration stage 20. In some works, there is a further, third filtration stage in order to wash more lime mud out of the liquor residues.

In order to prevent sedimentation onto the second filter 22 or the third filter 26 by fine-grained calcium oxide with certainty, and in particular not to send excess quantities of potentially disruptive calcium oxide to the downstream lime kiln 12, the process is carried out in a manner such that carbon dioxide is injected into the dilution vessel 21 or possibly also 25. Injection of the carbon dioxide, which derives from the lime kiln 12 via a return line 23, is in this case carried out in practice in a manner such that the dwell time for the carbon dioxide in the dilution vessel 21 or possibly 25 as well is guaranteed to be as long as possible. In this regard, the carbon dioxide may, for example, be introduced into the supply line to the filter 20 via one or more spargers or from below into the dilution vessel 21, or by means of a similar arrangement.

Introducing the carbon dioxide into the dilution vessel 21 is continued in this manner for a period until the pH of the suspension has dropped to a value of 8.5-12.

At pHs of this level, the majority of the calcium oxide in the suspension will have been converted into calcium carbonate, so that sedimentation onto the filter 26 is prevented with certainty. The calcium carbonate separated in the filter 22 is then returned to the lime kiln 12 and, after incineration to form calcium oxide, is returned to the recausticizing step 10 via the lime circuit 15.

In order, in particular, to allow the addition of carbon dioxide to the dilution vessels 21 and/or 25 to be controlled, a three-way valve 27 is installed in the return line 23 which allows the carbon dioxide supply to be switched between the dilution vessels 21 and 25. In this regard, it only remains to establish that clearly, it is also possible to supply the carbon dioxide to the dilution vessels 21 and 25 simultaneously.

Example 1

Laboratory test, preparation of an industrial green liquor with different dwell times, temperatures and different quantities of carbon dioxide additions.

Example 2

Laboratory test with an industrial green liquor, wherein different quantities of carbon dioxide are added with a constant stirring time and temperature.

Example 1

1 l of an industrial green liquor with a total alkali content of 165 g/l (calculated as NaOH) and a sulphidity of 35% was heated to 80° C. and 74 g of industrial quicklime (90% CaO) was added. The mixture was thermostatted to 101° C. and stirred for 2 h, and then evacuated using a glass fibre filter on a Buchner funnel using a water-jet vacuum.

The residue on the filter, a lime mud, was stirred with water at 70° C., the bottom was gassed with $CO_2$ through a glass frit and then evacuated as described above. Next, the dry matter content of the lime mud was determined gravimetrically.

The test was carried out a total of 7 times, wherein the parameters of stirring time, temperature and carbon dioxide addition were varied and both the dry matter content of the lime mud and the pH of the filtrate were determined as a result. The results are shown in Table 1.

TABLE 1

| Test | Stirring period Min | Temperature ° C. | Gassing g $CO_2$ | Dry matter content % | pH |
|---|---|---|---|---|---|
| 1A | 5 | 70 | 0 | 73 | 13.0 |
| 1B | 5 | 70 | 0.4 | 77 | 11.5 |
| 1C | 5 | 70 | 0.8 | 80 | 9.5 |
| 1D | 30 | 70 | 0 | 74 | 12.9 |
| 1E | 30 | 70 | 0.4 | 79 | 11.3 |
| 1F | 5 | 90 | 0 | 75 | 13.0 |
| 1J | 5 | 90 | 0.4 | 78 | 11.4 |

Table 1 shows that the temperature and dwell time have a rather small influence on the quantity of extracted lime mud compared with the use of carbon dioxide. Thus, for a stirring time of 5 minutes and a temperature of 70° C. without adding carbon dioxide, a dry matter content of 73% was determined, and for a stirring time of 30 minutes, a temperature of 70° C. and no addition of carbon dioxide, a dry matter content of 74% was obtained, and for a stirring time of 5 minutes, a temperature of 90° C. and without the addition of carbon dioxide, a dry matter content of 75% was obtained. However, when gassing with 0.4 g or 0.8 g of carbon dioxide was carried out, the dry matter content of the lime mud could be raised to 77% to 80%, without the pH of the filtrate, the white liquor, dropping off so far as to make the white liquor unsuitable for subsequent use in the digester, which would have been at a pH of less than approximately 8.5.

Example 2

1 l of an industrial green liquor with a total alkali content of 165 g/l (calculated as NaOH) and a sulphidity of 35% was heated to 80° C. and 78 g of industrial quicklime (80% CaO) was added. The mixture was thermostatted to 101° C. and stirred for 2 h, and then evacuated using a glass fibre filter on a Buchner funnel using a water-jet vacuum.

The residue on the filter, a lime mud, was stirred with water at 70° C., the bottom was gassed with $CO_2$ through a glass frit and then evacuated as described above. Next, the dry matter content of the lime mud was determined gravimetrically.

The test was carried out a total of 6 times, whereby only the carbon dioxide addition was varied and both the dry matter content of the lime mud and the pH of the filtrate were determined as a result. The results are shown in Table 2.

TABLE 2

| Test | Stirring period Min | Temperature ° C. | Gassing g $CO_2$ | Dry matter content % | pH |
|---|---|---|---|---|---|
| 2A | 5 | 70 | 0 | 65 | 13.4 |
| 2B | 5 | 70 | 0.4 | 68 | 13.0 |
| 2C | 5 | 70 | 0.8 | 70 | 12.5 |
| 2D | 5 | 70 | 1.2 | 74 | 11.9 |
| 2E | 5 | 70 | 1.6 | 79 | 10.7 |
| 2F | 5 | 70 | 2.0 | 81 | 9.3 |

This test shows that with a continuously increasing quantity of carbon dioxide employed, the dry matter content of the lime mud also increased continuously without the pH of the filtrate, the white liquor, dropping to an extent such that the white liquor would be unsuitable for subsequent use in the digester.

The invention claimed is:

1. A process for recausticizing green liquor in a sulphate or Kraft process for wood pulp production, the process comprising the following steps: a green liquor consisting of an aqueous solution of sodium carbonate as a major component and sodium sulphide is mixed with calcium oxide in a slaker and undergoes a reaction in a recausticizer to form an aqueous suspension containing sodium hydroxide and calcium carbonate as major components, which suspension is filtered on a first filter and subsequently filtered lime mud solids, after dilution with water in a dilution vessel, are fed over a second filter, or, are fed over the second and a third filters and filtered to separate the solids suspended therein, wherein after a first separation of calcium carbonate as the major component and calcium oxide as the minor component, the filtered lime mud solids are mixed with water to form a second aqueous suspension, carbon dioxide is added to the second aqueous suspension at least during dilution in the dilution vessel, and carbon dioxide is fed both to the dilution vessel which is associated with the second filter and also to the dilution vessel which is associated with the third filter.

2. The process as claimed in claim 1, wherein the period for supplying carbon dioxide is selected so as to coincide with a dwell time in the dilution vessel.

3. The process as claimed in claim 1, wherein carbon dioxide is added for a period of between 5 and 120 minutes.

4. The process as claimed in claim 1, wherein a total quantity of 0.1% to 5% by weight of dry carbon dioxide/kg of dry lime mud is added.

5. The process as claimed in claim 1, wherein the carbon dioxide is added at a temperature between 40° C. and 105° C.

6. The process as claimed in claim 1, wherein the carbon dioxide employed is selected from pure carbon dioxide, carbon dioxide diluted with air, and flue gas.

7. The process as claimed in claim 6, wherein flue gas from a lime kiln is used as the source of carbon dioxide.

8. The process as claimed in claim 3, wherein carbon dioxide is added for a period of between 5 and 30 minutes.

9. The process as claimed in claim 4, wherein a total quantity of 0.4% to 2.5% by weight of dry carbon dioxide/kg of dry lime mud is added.

10. The process as claimed in claim 5, wherein the carbon dioxide is added at a temperature between 65° C. to 100° C.

11. The process as claimed in claim 1, wherein a period for supplying carbon dioxide to the aqueous suspension containing calcium carbonate as the major component and calcium oxide as the minor component contained in the dilution vessel is selected such that a pH of the aqueous suspension in the range 8.0 to 13.0.

12. The process as claimed in claim 11, wherein the pH of the aqueous suspension is in the range of 8.5 to 12.

13. A process for recausticizing green liquor in a sulphate or Kraft process for wood pulp production, the process comprising the following steps: a green liquor consisting of an aqueous solution of sodium carbonate as a major component and sodium sulphide is mixed with calcium oxide in a slaker and undergoes a reaction in a recausticizer to form an aqueous suspension containing sodium hydroxide and calcium carbonate as major components, which suspension is filtered on a first filter and subsequently filtered lime mud solids, after dilution with water in a dilution vessel, are fed over a second filter, or, are fed over the second and a third filters and filtered to separate the solids suspended therein, wherein after a first separation of calcium carbonate as the major component and calcium oxide as the minor component, the filtered lime mud solids are mixed with water to form a second aqueous suspension, and carbon dioxide is added to the second aqueous suspension at least during dilution in the dilution vessel or carbon dioxide is fed both to the dilution vessel which is associated with the second filter and also to the dilution vessel which is associated with the third filter, wherein carbon dioxide is introduced into the dilution vessel via a vessel floor of the dilution vessel.

14. The process as claimed in claim 13, wherein carbon dioxide is introduced into the aqueous suspension being formed from the lime mud solids and water after the first filter and before the second filter in a divided manner via one or more inlet opening(s).

15. A process for recausticizing green liquor in a sulphate or Kraft process for wood pulp production, the process comprising the following steps: a green liquor consisting of an aqueous solution of sodium carbonate as a major component and sodium sulphide is mixed with calcium oxide in a slaker and undergoes a reaction in a recausticizer to form an aqueous suspension containing sodium hydroxide and calcium carbonate as major components, which suspension is filtered on a first filter and subsequently filtered lime mud solids, after dilution with water in a dilution vessel, are fed over a second filter, or, are fed over the second and a third filters and filtered to separate the solids suspended therein, wherein after a first separation of calcium carbonate as the major component and calcium oxide as the minor component, the filtered lime mud solids are mixed with water to form a second aqueous suspension, and carbon dioxide is added to the second aqueous suspension at least during dilution in the dilution vessel or carbon dioxide is fed both to the dilution vessel which is associated with the second filter and also to the dilution vessel which is associated with the third filter, wherein carbon dioxide is introduced into the line leading to one of the dilution vessels in a divided manner by means of a sparger.

* * * * *